United States Patent [19]

Agostini et al.

[11] Patent Number: 6,160,047
[45] Date of Patent: Dec. 12, 2000

[54] RUBBER COMPOSITION AND TIRE HAVING TREAD THEREOF

[75] Inventors: Giorgio Agostini, Colmar-Berg, Luxembourg; Thierry Florent Edme Materne, Attert, Belgium

[73] Assignee: The Goodyear Tire & Rubber Company, Akron, Ohio

[21] Appl. No.: 08/938,990

[22] Filed: Sep. 26, 1997

[51] Int. Cl.[7] .............................. C08K 3/04; C08K 3/06; B60C 11/00
[52] U.S. Cl. .......................... 524/494; 524/495; 524/262; 523/200; 523/212; 152/209.1
[58] Field of Search .................................. 524/494, 262, 524/495; 523/212, 200; 152/209.1

[56] References Cited

U.S. PATENT DOCUMENTS

| | | | |
|---|---|---|---|
| 3,660,132 | 5/1972 | Illigen et al. | 106/307 |
| 4,644,988 | 2/1987 | Ahmad et al. | 152/209 R |
| 5,328,949 | 7/1994 | Sandstrom et al. | 524/262 |
| 5,561,176 | 10/1996 | Garafalo et al. | 523/213 |

FOREIGN PATENT DOCUMENTS

0580370 A1  1/1994  European Pat. Off. .......... C08K 9/06

*Primary Examiner*—James J. Seidleck
*Assistant Examiner*—Olga Asinosky
*Attorney, Agent, or Firm*—H C Young, Jr.

[57] ABSTRACT

A rubber composition as a blend comprised of an elastomer (s), and particulate reinforcement provided as an intimate blend of carbon black particles and fumed silica particles, together with a coupling agent.

A tire having a component of such rubber composition such as, for example, a tread, is specifically contemplated.

24 Claims, No Drawings

RUBBER COMPOSITION AND TIRE HAVING TREAD THEREOF

FIELD

This invention relates to a rubber composition composed of at least one elastomer and reinforcement provided as an intimate blend of carbon black and fumed silica particles. The invention also relates to a tire having a component thereof such as, for example, a tread.

BACKGROUND

Elastomers are conventionally reinforced with dispersions of particulate carbon black and/or silica.

It is often difficult to obtain an adequate, heterogeneous dispersion of the silica in the rubber composition, due at least in part to the substantial tendency of the silica particles to agglomerate together to form "clumps" of silica which do not easily disperse within the rubber composition during the rubber/silica blending process under high shear conditions.

In the description of this invention, for convenience, articles and aggregates of silica and carbon black are used interchangeably. It is believed to be understood by those having skill in such art that particles of silica and of carbon black are usually present in a form of aggregates of individual primary particles thereof. Therefore, it is primarily the aggregates that tend to agglomerate together to form the "clumps" since the actual primary particles are normally only small portions of the silica and/or carbon black as the case may be.

In practice, rubber products such as tires are typically prepared of components such as, for example, treads of elastomer based rubber compositions which are conventionally carbon black reinforced. Sometimes tire tread rubber compositions may also be reinforced with silica by utilizing a combination of individual silica and carbon black particles. Typically, the silica is a precipitated silica.

Often coupling agents are used with precipitated silica to assist in its reinforcement of elastomers with which the silica is mixed. Utilization of silica couplers for such purpose is well known to those skilled in such art.

It is appreciated that adequate dispersion of the silica particles within the rubber composition is usually a concern.

In the description of this invention, the term "phr" where used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

SUMMARY AND PRACTICE OF THE INVENTION

For this invention, a relatively intimate dispersion of carbon black and silica is created by forming a composite as an intimate blend of individual particles of fumed silica with fumed carbon black. Such composite might be formed, for example, by adding fumed silica during the process of fuming the carbon black to form a carbon black-fumed silica particulate blend which is referred to herein as a "carbon black composite".

In accordance with this invention, a rubber composition is prepared by blending (A) 100 parts by weight of at least one diene-based elastomer selected from homopolymers of conjugated dienes, copolymers of conjugated dienes and copolymers of conjugated dienes with vinyl aromatic compounds such as styrene and alpha-methylstyrene;

(B) about 30 to about 110, alternatively about 30 to about 90, phr of reinforcing filler composed of (i) a carbon black composite or (ii) about 20 to about 70, or even up to about 90, phr of said carbon black composite and about 10 to about 40 phr of at least one of additional rubber reinforcing carbon black and precipitated silica; wherein said carbon black composite is composed of an intimate blend of fumed-carbon black particles and fumed silica particles; wherein said fumed silica particles of said carbon black composite contain silanol groups on the surface thereof; wherein said carbon black particles of said carbon black composite and said additional carbon black contain hydroxyl groups on the surface thereof; and wherein the silicon to carbon ratio of said carbon black composite is in a range of about 0.1/1 to about 0.9/1; and (C) at least one coupling agent having a moiety reactive with the said silanol groups and said hydroxyl groups and another moiety interactive with at least one of said diene-based elastomers.

The invention includes such prepared rubber compositions.

The invention also includes a tire having at least one component of such rubber composition, particularly a tire tread.

A particular advantage in using the aforesaid intimate blend of individual carbon black particles and fumed silica particles is to promote a more homogenous dispersion of silica and carbon black in a rubber composition, especially for a tire tread rubber composition.

As hereinbefore discussed, it is sometimes somewhat difficult to provide a highly homogeneous dispersion of particulate silica in a rubber composition where a quantitative amount of silica is used such as, for example, at least about 10 phr of silica, because of an inherent tendency of silica particles, or aggregates of particles, to tend to agglomerate together.

It is contemplated that the carbon composite of this invention enables a more efficient blending of silica particles into a rubber composition. While the mechanism of such blending of silica particles may not be completely understood, it is envisioned that the carbon black may act, at least in some degree, as an integral partitioning agent for the fumed silica particles. Further, a particular advantage of the invention, namely use of the carbon black composite, is envisioned in a sense that because fumed silica has a very low bulk density (ASTM Test D-1513), meaning that it has a very high volume per weight of silica, it is considerably more difficult to form a homogeneous dispersion, or blend, of the silica in a rubber composition in a classical mixing apparatus such as a Banbury mixer. It is contemplated that a practice of this invention, namely use of the carbon black composite, promotes a better dispersion of the relatively low bulk density fumed silica into a rubber composition.

It is contemplated that the practice of this invention promotes better handling of fumed silica, limit partial re-agglomeration of silica and also carbon black particles, or aggregates of silica or carbon black particles, and thereby enable a better, more homogeneous dispersion thereof in the rubber composition.

Further, by adjusting the ratio of silica/carbon black of the carbon black composite, the degree of electrical conductivity of the reinforced rubber composition may be adjusted, or modified, as may be measured by volume resistivity of the resulting rubber composition (e.g. DIN 53483 or ASTM Test D257-92).

In the practice of this invention, it is contemplated that the pre-formed intimate blend of fumed silica and carbon black will reduce the agglomeration effect of the silica particles and thereby promote a more homogeneous dispersion of the silica in the rubber composition.

In one aspect of the invention, it is desired that the rubber composition is prepared by (a) thermomechanically working and mixing, in at least two sequential mixing steps, a mixture comprised of the said diene-based elastomer, carbon black composite, and optionally the said additional carbon black and/or precipitated silica, all in the absence of curatives (i) to a maximum temperature in a range of about 160° C. to about 180° C. and for a duration of time, upon reaching said maximum temperature, in a range of about 1 to about 10 minutes at a temperature within about 5° C. to about 10° C. of said maximum temperature or (ii) to a maximum temperature in a range of about 155° C. to about 165° C. and for a duration of time upon reaching said maximum temperature, in a range of about four to about twenty minutes at a temperature within about 5° C. to about 10° C. of said maximum temperature, followed by (b) a final thermomechanical mixing step in which sulfur curatives and cure accelerators are mixed with said mixture for about one to about four minutes to a temperature of about 90° C. to about 120° C.; whereas the rubber mixture is cooled to a temperature below about 40° C. between each of the aforesaid mixing stages.

Depending somewhat upon the rotor speed of the mixer, the fill factor and the rubber composition itself, the time to reach the maximum temperature may range from about 2 to about 5 minutes. The term "fill factor" is believed to be well known to those having skill in such art as the portion of the volume of the internal mixer occupied by the rubber composition itself. Other parameters being equal, a rubber composition having a higher oil content will usually take a longer time to reach the maximum temperature.

In practice, an internal rubber mixer is preferred for the individual mixing steps.

In the recited mixing process the term "curatives" in intended to refer to rubber vulcanization curatives in a conventional sense, meaning sulfur together with accompanying sulfur vulcanization accelerators or perhaps, although not preferred, peroxide curatives might be used.

The carbon black composite for use in this invention may be prepared, for example, by combining the reactor effluent of a fumed silica reactor, at an elevated temperature, such as at least about 500° C., with or in a carbon black furnace reactor, to provide a composite of discrete carbon black and fumed silica entities. Thus, such process could combine both fumed silica and furnace black production technologies.

In the practice of this invention, it is to be appreciated that the carbon black conventionally has substituents on its surface such as, for example, hydroxyl groups as well as carboxyl, phenyl and quinone groups, which are generally considered to be reactive groups although for convenience, the hydroxyl groups are usually referred to in the description of this invention. It is also to be appreciated that the silica conventionally has silanol groups on its surface. Both of such hydroxyl groups and such silanol groups are intended to be conventionally reactive with the aforesaid coupler.

In one aspect, it is contemplated that the carbon black composite used in this invention may be exclusive of, or at least essentially exclusive of, a functionalized carbon black created by reacting carbon black with an organic silane, particularly an alkoxy silane, including trialkoxy silanes.

However, if desired, the surface of the carbon black composite can be further functionalized by reacting the carbon black composite itself with, for example, an organic silane such as, for example, a trialkoxy silane of the formula $(OR)_3SiR'$ where R is a hydrocarbon radical having from one to 3 or 4 carbon atoms such as, for example, those selected from methyl, ethyl and propyl radicals and R' is a hydrocarbon radical having from 6 to 16 or more carbon atoms such as, for example, those selected from hexyl, octyl, docecyl, hexadecyl and octadecyl radicals.

In practice, it is contemplated that the silica, which contains silanol groups on its surface, also includes silica containing from about 0.1 to about 10 percent of at least one of aluminum, titanium, zirconium and magnesium entities, based on the silicon. Usually aluminum and/or titanium is preferred. The aluminum, titanium, zirconium and magnesium moieties may be conventionally combined with the silica during its fuming process by adding to the silica precursor the desired quantities of organometallic compounds of titanium, aluminum, zirconium and/or magnesium. Exemplary compounds might be found in *ABCR Catalogue on Metalorganics,* ABCR Gmbh & Co KG, Karlsruhe, Germany.

Classical rubber-reinforcing carbon blacks considered for use in this invention, including carbon blacks used for preparation of the carbon black composite, are, for example, carbon blacks having an Iodine Adsorption Number (ASTM test D1510) in a range of about 30 to about 180 and sometimes even up to about 250 g/kg and a DBP (dibutylphthalate) Adsorption Number (ASTM test D2414) in a range of about 20 to about 150 $cm^3$/100 g. Representative examples of such carbon blacks, and references to associated ASTM test methods, may be found, for example, in *The Vanderbilt Rubber Handbook,* 1990 edition on pages 416 to 418.

The resultant physical properties obtained for rubber compositions of this will depend somewhat upon the carbon black composite used, the coupler used and the rubber composition itself.

In practice, a contemplated weight ratio of coupler to the said carbon black composite, and additional precipitated silica if used, may be in a range of about 0.01/1 to about 0.25/1 which is somewhat dependent somewhat upon the fumed silica component of the carbon black composite.

The rubber composition itself can also be provided as being a sulfur cured composition through vulcanization of the uncured elastomer composition. The sulfur curing is accomplished in a conventional manner, namely, by curing under conditions of elevated temperature and pressure for a suitable period of time.

The curatives for sulfur curing the rubber composition are curatives conventionally used for sulfur curable elastomers which typically include sulfur and one or more appropriate cure accelerators and sometimes also a retarder. Such curatives and use thereof for sulfur curable elastomer compositions are well known to those skilled in the art.

Sequential mixing processes for preparing sulfur curable rubber compositions in which elastomers and associated ingredients exclusive of curatives are first mixed in one or more sequential steps, usually called a "non-productive mixing step(s)" followed by a final mixing step for adding curatives, usually called a "productive mixing step", are also well known to those skilled in the art.

In the practice of this invention, the elastomers are typically selected from homopolymers and copolymers of conjugated dienes and copolymers of conjugated diene(s) and vinyl aromatic compound. Such dienes may, for example, be selected from isoprene and 1,3-butadiene and such vinyl aromatic compounds may be selected from styrene and alpha-methylstyrene. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), high vinyl polybutadiene rubber having from about 35 to about 90 percent vinyl 1,2- content and emulsion polymerization prepared butadiene/acrylonitrile copolymers.

In one aspect, particularly for a tire tread, the rubber might be of at least two of diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and/or solution polymerization derived styrene/butadiene rubbers, and cis 1,4-polybutadiene rubber.

The vulcanized rubber composition should normally contain a sufficient amount of the said carbon black reinforcing filler(s), particularly the carbon black composite, namely, at least about 30, and usually at least about 40, phr to contribute toward a reasonably high modulus, high abrasion resistance and resistance to tear for the cured rubber composition. Thus, the amount of said carbon black composite, as hereinbefore referenced, may be as low as about 30 parts per 100 parts rubber, but is usually preferably from about 40 to about 90 or even up to about 100 or more parts by weight.

Additional silica, particularly precipitated silica, as hereinbefore referenced, might also be used in combination with the said carbon black composite and coupler.

It is intended for the practice of this invention that the term "precipitated silica", when used herein, also includes precipitated aluminosilicates as a form of precipitated silica. The precipitated silicas are, for example, those obtained by the acidification of a soluble silicate, e.g., sodium silicate, generally exclusive of silica gels.

Such silicas might be characterized, for example, by having a BET surface area, as measured using nitrogen gas, preferably in the range of about 40 to about 600, and more usually in a range of about 50 to about 300 square meters per gram ($m^2/g$). The BET method of measuring surface area is described by Brunauer, Emmett and Teller: *Journal of American Chemical Society* (1938) page 309. An additional reference might be DIN Method 66131.

The silica may also be typically characterized by having a DBP (dibutylphthalate) Absorption Number in a range of about 100 to about 400, and more usually about 150 to about 300 cc/100 g.

The silica might be expected to have an average ultimate particle size, for example, in the range of 0.003 to 0.05 micron as determined by the electron microscope, although the silica particles may be even smaller, or possibly larger, in size.

The silica may sometimes be expected to have mercury porosimetry characteristics such as, for example, HgSSA in a range of about 50 to about 250 $m^2/g$, a V(Hg) in a range of about 1 to about 3.5 $cm^3/g$ and a PSD max between 10 to about 50 nm.

Various commercially available precipitated silicas may be considered for use in this invention such as, only for example herein, and without limitation, silicas commercially available from PPG Industries under the Hi-Sil trademark with designations 210, 243, etc; silicas available from Rhone-Poulenc with, for example, designations of Zeosil 1165MP and silicas available from Degussa AG with, for example, designations VN2 and VN3, BV3380GR, etc. and from Huber as Zeopol 8745.

Various couplers may be used and many are well known to those skilled in such art. For example bis (trialkoxysilylalkyl) polysulfides may be used which contain from two to about eight sulfur atoms in their polysulfidic bridge, with an average of about 2 to about 5 sulfur atoms. For example, the polysulfidic bridge may contain an average of from about 2 to 3 or 3.5 to 5 sulfur atoms. The alkyl groups may be selected, for example, from methyl, ethyl, and propyl groups. Therefore, a representative coupler might be, for example, a bis(triethoxysilylpropyl) polysulfide containing from 2 to 8, with an average of about 2 to about 5, sulfur atoms in its polysulfidic bridge.

It is to be appreciated that the coupler, if in a liquid form, might be used in conjunction with a carbon black carrier, namely, pre-mixed with a carbon black prior to the addition to the rubber composition, and such carbon black is usually to be included in the amount of carbon black accounted for in the rubber composition formulation.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

In the preparation of the rubber composition typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 1 to 5 phr.

Typical amounts of fatty acids, if used, which can include stearic acid, palmitic acid, linoleic acid or mixtures of one or more fatty acids, can comprise about 0.5 to about 5 phr. Often stearic acid is used in a relatively impure state and is commonly referred to in the rubber compounding practice as "stearic acid" and is so referred to in the description and practice of this invention.

Typical amounts of zinc oxide comprise about 1 to about 5 phr. Typical amounts of waxes comprise about 1 to about 5 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above ingredients, other than carbon black and coupler, are not considered to be the primary subject of this invention which is more primarily directed to the use of the aforesaid carbon black composite for the reinforcement of rubber compositions, include rubber compositions for tire treads.

The ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, carbon black and coupling agent if used, are mixed in one or more non-productive mix stages. The terms "non-productive" and "productive" mix stages are well known to those having skill in the rubber mixing art.

In at least one of the non-productive (NP) mixing stages, the materials are thermomechanically mixed and the mixing temperature is allowed to reach a temperature of, for example, between 140° C. and 190° C.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

This Example is provided as an example of a contemplated practice of this invention.

Rubber compositions composed of diene-based elastomer(s) which contain the carbon black composite reinforcement, together with coupling agents, may be prepared.

The rubber compositions may be composed of (1) at least one diene-based elastomer as hereinbefore described, (2) carbon black composite of this invention, (3) coupler, and (4) rubber compounding ingredients including conventional amounts of zinc oxide, zinc stearate, rubber processing oil, waxes, and antidegradants.

The thermomechanical mixing in this Example is accomplished by (a) thermomechanically working and mixing, in at least two sequential mixing steps, a mixture comprised of the said diene-based elastomer, carbon black composite, and optionally the said additional carbon black and/or precipitated silica, all in the absence of curatives cure accelerators (i) to a maximum temperature of about 160° C. to about 170° C. and for a duration of time, upon reaching said maximum temperature, in a range of about 2 to about 4 minutes at a temperature within about 5° C. to about 10° C. of said maximum temperature, followed by (b) a final mixing step in which sulfur curatives and cure accelerators are mixed with said mixture for about one to about three minutes to a temperature of about 100° C. to about 120° C.; whereas the rubber mixture is cooled to a temperature below about 30° C. between each of the aforesaid mixing stages.

The rubber composition may then be molded and cured at an elevated pressure and temperature of about 150° C., or it may be built onto a tire carcass and the resulting assembly molded and cured at a temperature of about 150° C.

For this Example, rubber reinforcement is used in a form of about 30 to about 110 phr of reinforcing filler as the said carbon black composite.

As an alternative, such rubber reinforcing filler, within the aforesaid range of about 30 to 100 phr, can be composed of a combination of such carbon black composite together with classical carbon black and/or precipitated silica.

The carbon black composite is composed of an intimate blend of fumed carbon black particles and fumed silica particles created by cofuming (combining) the reactor streams of a fumed silica reactor with, or in a carbon black furnace reactor, at an elevated temperature suitable for the fuming of the silica and the production of the carbon black.

As previously described, the silica particles of the carbon black composite contain silanol groups on their surface and the carbon black particles contain hydroxyl groups on their surface.

The coupler used in this example is a bis (triethoxysilylpropyl) polysulfide containing from 2 to 8 sulfur atoms in its polysulfidic bridge with an average of either (i) about 2.3 to about 3 or (ii) about 3.5 to about 4 sulfur atoms in its polysulfidic bridge.

EXAMPLE II

Tires of size 195/65R15 are contemplated as being prepared having treads, individually, of rubber compositions presented in Example I herein.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a tread of a rubber composition comprised of the product of blending:

(A) 100 parts by weight of at least one diene-based elastomer selected from homopolymers of conjugated dienes, copolymers of conjugated dienes and copolymers of conjugated dienes with vinyl aromatic compounds selected from at least one of styrene and alpha-methylstyrene;

(B) about 30 to about 110 phr of reinforcing filler composed of (i) a carbon black composite or (ii) about 20 to about 70 phr of said carbon black composite and (a) about 10 to about 40 phr of at least one of additional rubber reinforcing carbon black and precipitated silica; wherein said carbon black composite is composed of an intimate blend of fumed carbon black particles and fumed silica particles; wherein said fumed silica particles of said carbon black composite and said precipitated silica contain silanol groups on the surface thereof; wherein said carbon black particles of said carbon black composite and said additional carbon black contain hydroxyl groups on the surface thereof; wherein said silica particles of said carbon black composite reinforcing filler contain from about 0.1 to about 10 percent of at least one of aluminum, titanium, zirconium and magnesium entities, based upon the silicon content of the silica; and wherein the silicon to carbon ratio of said carbon black composite is in a range of about 0.1/1 to about 0.9/1, and (C) at least one coupling agent having a moiety reactive with the said silanol groups and said hydroxyl groups and another moiety interactive with at least one of said diene-based elastomers; said rubber composition is prepared by (a) thermomechanically working and mixing, in at least two sequential mixing steps, a mixture comprised of the said diene-based elastomer, carbon black composite, and optionally the said additional carbon black and/or precipitated silica, all in the absence of curatives (i) to a maximum temperature in a range of about 160° C. to about 180° C. and for a duration of time, upon reaching said maximum temperature, in a range of about 1 to about 10 minutes at a temperature within about 5° C. to about 10° C. of said maximum temperature or (ii) to a maximum temperature in a range of about 155° C. to about 165° C. and for a duration of time upon reaching said maximum temperature, in a range of about four to about twenty minutes at a temperature within about 5° C. to about 10° C. of said maximum temperature, followed by (b) a final thermomechanical mixing step in which sulfur curatives and cure accelerators are mixed with said mixture for about one to about four minutes to a temperature of about 90° C. to about 120° C.; whereas the rubber mixture is cooled to a temperature below about 40° C. between each of the aforesaid mixing stages.

2. The tire of claim 1 wherein, for said tread rubber composition, said carbon black composite is blended with said elastomer(s) as an intimate blend of carbon black and fumed silica particles.

3. The tire of claim 2 where, for said tread rubber composition, said carbon black composite is prepared by introducing fumed silica to the preparation of fumed carbon black at a temperature of at least about 500° C.

4. The tire of claim 1 wherein, for said tread rubber composition, said diene-based elastomer(s) is selected from homopolymers and copolymers of conjugated dienes and copolymers of conjugated diene(s) and vinyl aromatic compound.

5. The tire of claim 2 wherein, for said rubber composition, said diene-based elastomer(s) is selected from homopolymers and copolymers of conjugated dienes and copolymers of conjugated diene(s) and vinyl aromatic compound.

6. The tire of claim 3 wherein, for said tread rubber composition, said diene-based elastomer(s) is selected from homopolymers and copolymers of conjugated dienes and copolymers of conjugated diene(s) and vinyl aromatic compound.

7. The tire of claim 4 wherein said diene is selected from isoprene and 1,3-butadiene and the vinyl aromatic compound is selected from styrene and alpha-methylstyrene.

8. The tire of claim 5 wherein said diene is selected from isoprene and 1,3-butadiene and the vinyl aromatic compound is selected from styrene and alpha-methylstyrene.

9. The tire of claim 6 wherein said diene is selected from isoprene and 1,3-butadiene and the vinyl aromatic compound is selected from styrene and alpha-methylstyrene.

10. The tire of claim 1 wherein, for said tread rubber composition, said diene-based elastomer(s) is selected from at least one of cis 1,4-polyisoprene rubber (natural and/or synthetic), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (and such vinyl aromatic compound 70–95 percent trans), low vinyl polybutadiene rubber (10–30 percent vinyl), high vinyl polybutadiene rubber having from about 35 to about 90 percent vinyl 1,2-content and emulsion copolymers.

11. The tire of claim 2 wherein, for said tread rubber composition, said diene-based elastomer(s) is selected from at least one of cis 1,4-polyisoprene rubber (natural and/or synthetic), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (and such vinyl aromatic compound 70–95 percent trans), low vinyl polybutadiene rubber (10–30 percent vinyl), high vinyl polybutadiene rubber having from about 35 to about 90 percent vinyl 1,2-content and emulsion copolymers.

12. The tire of claim 3 wherein, for said tread rubber composition, said diene-based elastomer(s) is selected from at least one of cis 1,4-polyisoprene rubber (natural and/or synthetic), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (and such vinyl aromatic compound 70–95 percent trans), low vinyl polybutadiene rubber (10–30 percent vinyl), high vinyl polybutadiene rubber having from about 35 to about 90 percent vinyl 1,2-content and emulsion copolymers.

13. The tire of claim 1 wherein, for said tread rubber composition, said reinforcing filler is from about 30 to about 90 phr of said carbon black composite.

14. The tire of claim 2 wherein, for said tread rubber composition, said reinforcing filler is from about 30 to about 90 phr of said carbon black composite based on 100 parts by weight of elastomers.

15. The tire of claim 3 wherein, for said tread rubber composition, said reinforcing filler is from about 30 to about 90 phr of said carbon black composite based on 100 parts by weight of elastomers.

16. The tire of claim 1 wherein said reinforcing filler is composed of about 20 to about 70 phr of said carbon black composite and from about 10 to about 40 phr of at least one of additional carbon black reinforcement and precipitated silica.

17. The tire of claim 2 where said reinforcing filler is composed of about 20 to about 70 phr of said carbon black composite and from about 10 to about 40 phr of at least one of additional carbon black reinforcement and precipitated silica.

18. The tire of claim 3 wherein said reinforcing filler is composed of about 20 to about 70 phr of said carbon black composite and from about 10 to about 40 phr of at least one of additional carbon black reinforcement and precipitated silica.

19. The tire of claim 1 wherein said carbon black composite is functionalized by reacting it with a trialkoxy silane of the formula $(OR)_3SiR'$, where R is selected from methyl, ethyl and propyl radicals and R' is selected from hexyl, octyl, dodecyl, hexadecyl and octadecyl radicals.

20. The tire of claim 1 wherein said coupler is a bis(trialkoxysilylalkyl) polysulfide having from 2 to 8, with an average of about 2 to about 5, sulfur atoms in its polysulfidic bridge.

21. The tire of claim 2 wherein said coupler is a bis(trialkoxysilylalkyl) polysulfide having from 2 to 8, with an average of about 2 to about 5, sulfur atoms in its polysulfidic bridge.

22. The tire of claim 20 wherein said coupler is a bis(triethoxysilylpropyl) polysulfide.

23. The tire of claim 21 wherein said coupler is a bis(triethoxysilylpropyl) polysulfide.

24. A tire having a tread of a rubber composition comprised of the product of blending:

(A) 100 parts by weight of at least one diene-based elastomer selected from homopolymers of conjugated dienes, copolymers of conjugated dienes and copolymers of conjugated dienes with vinyl aromatic compounds selected from at least one of styrene and alpha-methylstyrene;

(B) about 30 to about 110 phr of reinforcing filler composed of (i) a carbon black composite or (ii) about 20 to about 70 phr of said carbon black composite and (a) about 10 to about 40 phr of at least one of additional rubber reinforcing carbon black and precipitated silica; wherein said carbon black composite is composed of an intimate blend of fumed carbon black particles and fumed silica particles; wherein said fumed silica particles of said carbon black composite and said precipitated silica contain silanol groups on the surface thereof; wherein said carbon black particles of said carbon black composite and said additional carbon black contain hydroxyl groups on the surface thereof; and wherein the silicon to carbon ratio of said carbon black composite is in a range of about 0.1/1 to about 0.9/1, and (C) at least one coupling agent having a moiety reactive with the said silanol groups and said hydroxyl groups and another moiety interactive with at least one of said diene-based elastomers; wherein said carbon black composite is prepared by introducing fumed silica to the preparation of fumed carbon black at a temperature of at least 500° C.

* * * * *